April 7, 1970   J. T. ROBSON   3,504,954
BEARING SUPPORT PLATE
Filed Feb. 29, 1968

INVENTOR
JAMES T. ROBSON
BY
ATTORNEY

United States Patent Office 3,504,954
Patented Apr. 7, 1970

3,504,954
BEARING SUPPORT PLATE
James T. Robson, Cleveland Heights, Ohio, assignor to Ferro Corporation, Cleveland, Ohio, a corporation of Ohio
Filed Feb. 29, 1968, Ser. No. 709,256
Int. Cl. F16c 23/00
U.S. Cl. 308—58                                      3 Claims

ABSTRACT OF THE DISCLOSURE

The present invention relates to a novel journal support plate for use in conjunction with rollers such as those used in roller mills, enclosures and other similar apparatus, and particularly in conjunction with rollers used in enclosures, such as dryers, ovens, kilns, furnaces and the like wherein the rollers are capable of being adjusted both horizontally and vertically, whereby the position of the rollers may be more readily adjusted, both horizontally and vertically, while the enclosure is shut down, or while it is operating, even at full heat.

BACKGROUND OF INVENTION

This invention relates to a novel journal support plate for use in conjunction with rollers such as those used in roller mills, enclosures and other similar apparatus, and particularly in conjunction with rollers used in enclosures such as dryers, ovens, kilns, furnaces and the like, whereby the alignment of the rollers can be uniformly maintained, and whereby the position of the rollers may be more readily and accurately adjusted, both horizontally and vertically, while the enclosure is shut down, or while it is operating, even at full heat.

As used herein the term "enclosure" shall be understood to include dryers, ovens, kilns, furnaces and the like wherein an elevated temperature is maintained to dry, cure, freeze, bake, calcine or otherwise fire ceramic, plastic, refractory, or other types of ware and materials, including pigments, powders, sheet goods, and the like, wherein the ware or material is caused to travel through the enclosure by the axial rotation of a plurality of rollers, usually, but not necessarily, in substantially parallel axial alignment perpendicular to the direction of travel of the ware through the oven. In such cases the ware may ride directly on the rollers, or be supported on a belt, grid, or other conveying means which is in turn supported on and driven by the rollers.

One of the main problems encountered in the operation of enclosures wherein rollers are employed to effect travel through the enclosure, is the adjustment of the rollers to obtain and maintain as nearly as possible, perfectly uniform alignment, both horizontally and vertically, at some predetermined angle with respect to the wall members which form the enclosure, or some independent point or plane of reference. It is necessary to maintain alignment of the individual rollers with respect to each other, in axial parallel alignment, and alignment of the rollers collectively in longitudinal alignment either to form a uniform angle with the enclosure wall, or in a perfectly level plane. In most such instances, it is desired to have the rollers so aligned as to constitute a single perfectly level plane.

It has long been known that no matter how perfectly the rollers may be aligned during construction of the enclosure, or prior to initial use, minor variations in expansion and contraction or movement characteristics in the various components of the enclosure, or the lack of complete uniformity of temperature throughout the enclosure, generally results in a misaligning of the rollers when the enclosure is first brought up to temperature. In addition, there is an almost constant need to realign, often from day-to-day, or even shift-to-shift because of changes in atmospheric conditions, day-to-day variations in the heating conditions throughout the enclosure, the size, weight and/or composition of materials traveling through the enclosure, and a large number of other factors well known to those skilled in the art. It has, therefore, been found essential in the past to make regular adjustments of the rollers in order to maintain a particular alignment within tolerances, in many cases, of 0.001 inch or less.

In the past it has been accepted practice to directly affix the bearing unit to the outer frame of the enclosure, as taugh, for example by United States Patent No. 1,938,-581 to Cope et al. (see FIG. 4 and specification, column 3, lines 18–26). In such cases it was usually necessary to effect the vertical adjustment of the rollers, on a hit or miss basis, by inserting one or more shims of varying sizes beneath the bearing. After insertion of the shims, the bearing was reaffixed to the frame, after which it was usually necessary to make an adjustment in the number and/or size of the shims beneath the bearing at the other end of the roller, and to continue with a series of such hit or miss adjustments until each of the rollers had been placed in approximately a level position. This method was at best, inaccurate, time consuming tedious, and in many instances wholly incapable of accomplishing the required adjustments, e.g. if more than two or three rollers are out of adjustment, the shims under each of the bearings of each of the rollers must be separately adjusted and re-adjusted, etc. In addition, the methods heretofore employed to adjust the alignment of the rollers were usually difficult and often impossible to practice when the oven was operating at temperature.

Where the bearing was affixed to the outer frame of the enclosure by a means which would allow longitudinal adjustment, that is in a direction parallel with the direction of travel through the enclosure, the adjustment was normally accomplished by loosening the bolts on the extended bearing ends and then tapping them, usually with a hammer, either forward or backwards to line them up, after which they were bolted down tight without any true or accurate measurement as to how much they were actually moved. The alignment was then usually checked by operating the enclosure, and if, by the flow of wear through the enclosure, it was determined that the adjustment was still not correct, the process was usually tried again, or the operator tried to adjust the bearing on the other side of the enclosure. This also was even more expensive, tedious, and inefficient, and totally lacking in accuracy and/or reproducibility. Where both vertical and longitudinal adjustment of the position of the rollers was necessary the cost of affecting the adjustment, both from the point of view of direct labor required to effect alignment and from the point of view of lost production, heretofore represented an inordinate expense which can be substantially reduced and almost eliminated by employing the novel bearing plate of the present invention.

The discussion of horizontal and/or vertical alignment, both hereinbefore and hereinafter, relates to alignment and positioning of the rollers with respect to each other, and/or the walls of the enclosure, and/or some independent indicating means such as a level or plumb line, and should not be confused with axial alignment and positioning of the rollers within the bearing assembly. Thus, it has long been known that a bearing assembly can be constructed in such a manner as to provide a predetermined amount of play, between the elements of the bearing assembly which engage the roller, and the housing of the bearing assembly which was affixed directly to the frame of enclosure. Such bearing assemblies, usually referred to as "self-aligning bearings," are commercially available as proprietary articles of manufacture. It is, of course, well known that self-aligning bearings are only capable of providing minor adjustment in the axial alignment of the bearing and the roller, and where substantial adjustment of the axial alignment was required, it was necessary to realign the housing of the bearing assembly at the point where it was affixed to the frame of the enclosure, an operation also heretofore accomplished by means of shims, and hit or miss adjustment methods.

While self-aligning bearings are not a part of the present invention, they may, of course, be useful in conjunction with the novel bearing plate of the present invention. It will, of course, be understood, however, that the novel bearing support plate of the present invention functions equally well with any other type of bearing assembly; and, in addition, as will be seen in more detail hereinafter, it greatly facilitates substantial axial re-alignment of the roller and the bearing, no matter what type of bearing assembly is employed.

A number of prior patents such as, for example, United Stated Patent 1,989,957, teach a plurality of elements, including a resilient member, adapted to prevent undue loss of heat from the inside of the enclosure, through the openings in the side walls of the enclosure which accommodate the rollers. The teachings of these patents, like the so-called self-aligning bearings, relate not to the more accurate, facile, and/or speedier, adjustment and alignment of the rollers, but to a plurality of elements which will prevent damage to the enclosure assembly due to a minor axial misalignment of the rollers. These prior patents, of course, teach neither the importance of vertical, longitudinal, and/or planar alignment and positioning of the rollers, or a means by which such alignment and positioning can be accomplished.

DRAWINGS

FIGURE 1a illustrates a cut-away portion of the outer frame of the enclosure suitably adapted to accommodate the novel bearing plate of the present invention.

FIGURE 1b illustrates the preferred novel journal support plate of the present invention.

FIGURE 1c illustrates a bearing assembly particularly useful in conjunction with the novel journal support plate of the present invention.

SUMMARY OF INVENTION

The present invention provides a novel apparatus comprising a journal support plate, which facilitates adjustments of the type not heretofore possible, and in addition greatly improves the speed and accuracy with which previously common adjustments can be made. The novel apparatus of the present invention is directed to a separate, movable journal support plate which comprises:

(a) A base member,
(b) Means to suitably affix said base member to a frame member of the apparatus,
(c) Aligning means to align said plate longitudinally and laterally with respect to said apparatus,
(d) Adjusting means whereby said base member may be moved up or down in a vertical direction,
(e) Means to suitably attach a bearing to said base member, said attaching means being suitably disposed to allow longitudinal movement of said bearing with respect to said base member in a direction perpendicular to the axis of rotation of said roller,
(f) Positioning means whereby the longitudinal position of said bearing with respect to said base member may be adjusted.

It will, of course, be understood that while the novel journal support plate of the present invention will facilitate vertical, longitudinal and/or planar alignment and positioning of the rollers without the need to resort to an independent standard or point of references, it is best employed in conjunction with some leveling means such as one or more levels and/or a plumb line whereby the rollers can be adjusted and aligned to some outside standards or reference point other than the eye of the operator who is making the adjustments. It will also be understood that in general the limits of each adjustment are a function of the length of the bolts, pins, dowels, channels, etc. which constitute the various means recited above. Thus adjustments can be made within very wide limits by using long bolts, dowels and the like, either alone or in conjunction with well known mechanical alternatives or substitutes.

PREFERRED EMBODIMENT

The preferred embodiment of the present invention comprises a journal support plate of the type previously described wherein the base support plate is detachably mounted to the enclosure and wherein the adjusting and positioning means each comprise at least a pair of opposed, individually adjustable, stop members which can be readily repositioned to facilitate positioning of the bearing and/or roller, and which can then quickly be brought to bear on the surface of the bearing assembly and/or enclosure frame member firmly locking the assembly in position. The stop members which constitute the positioning means are directly opposed, while the stop members which constitute the adjusting means are opposed with respect to the means for affixing the base member to an enclosure frame member, since this means acts as a fulcrum on which the base member is mounted.

Figure 1C:
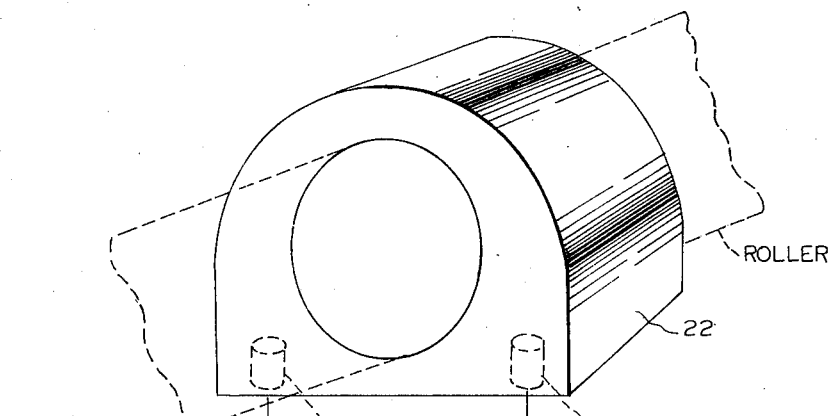
FIGURES 1a, 1b and 1c illustrate the preferred embodiment of the present invention in an exploded view.
Figure 1B:
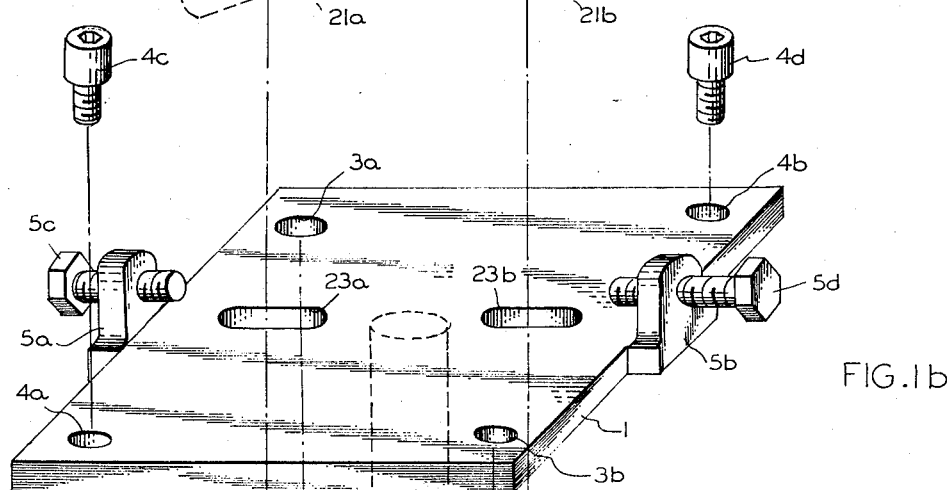
Figure 1A:
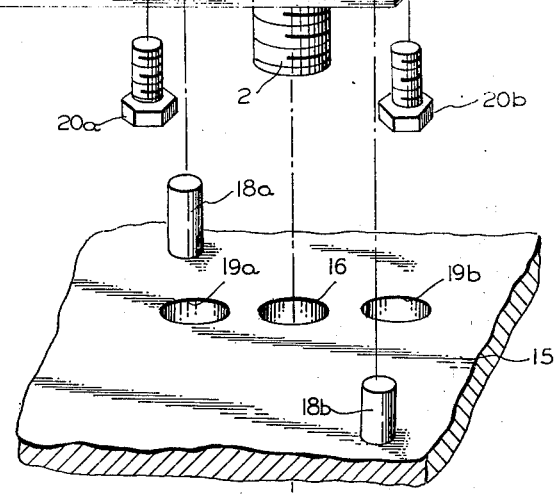

One of the preferred embodiments of the present invention is shown in an exploded view in FIG. 1. As shown in FIG. 1a illustrates a cut-away portion of the outer frame of the enclosure suitably adapted to accommodate the novel journal support plate of the present invention; FIG. 1b illustrates the preferred journal support plate of the present invention; and FIG. 1c illustrates a bearing assembly device particularly useful in conjunction with the preferred journal support plate of the present invention.

As illustrated in FIG. 1b, the novel journal support plate of the present invention comprises a base plate 1 having a bolt member 2 extending downwardly from its bottom surface through an aperture 16 in enclosure frame member 15, whereby the entire journal support plate assembly can be affixed in position and tightened in place by means of a nut 17. Bolt member 2 and nut 17 constitute the preferred affixing means of the present invention, and bolt member 2 functions as a fulcrum over which base plate 1 can be tilted. Base 1 has a first pair of apertures 3a and 3b which are opposed with respect to bolt member 2 and which will accommodate aligning studs 18a and 18b that are permanently affixed to frame member 15; and a second pair of apertures 4a and 4b which are also opposed with respect to bolt member 2 and which are suitably threaded to accommodate adjusting screws 4c and 4d which are of a suitable length to pass through threaded apertures 4a and 4b and come to bear upon the surface of enclosure frame member 15. When aligning studs 18a and 18b are positioned within apertures 3a and 3b in base plate 1, they longitudinally and laterally align the base plate with respect to the frame of the enclosure. Vertical adjustment is accomplished by loosening nut 17 and then loosening or tightening height adjusting screws 4c and 4d until the desired height is obtained, after which nut 17 is tightened, thereby securely affixing the vertical position of the journal support plate, and also that of the roller.

A bearing assembly 22 having a pair of threaded openings 21a and 21b, is affixed to base plate 1 by means of a pair of affixing bolts 20a and 20b which pass through a pair of suitably disposed channel apertures 23a and 23b in base plate 1 and screw into threaded openings 21a and 21b. Enclosure frame member 15 has a pair of apertures 19a and 19b which are in substantial alignment with apertures 23a and 23b in base plate 1, and which facilitate loosening and tightening of bolts 20a and 20b. Base plate 1 also has a pair of upwardly projecting flanges 5a and 5b in which positioning screw members 5c and 5d are threadably mounted. The longitudinal position of the roller (parallel to the direction of travel of ware through the enclosure) is adjusted by loosening affixing bolts 20a and 20b, and adjusting longitudinal positioning screws 5c and 5d until the bearing assembly and roller are in the desired longitudinal position. Bolt members 20a and 20b are then tightened securely locking the bearing assembly in longitudinal position.

Minor adjustment of the lateral or axial position of the roller with respect to the bearing is, of course, accomplished by suitable means within the bearing assembly and is not a part of this invention. It will be understood, however, that major changes in the axial alignment can be effected by repositioning height adjusting screws 4c and 4d until the desired angle of inclination is obtained.

Major changes in axial alignment between the bearing assembly and the roller would, of course, require that there be a certain amount of play in the diameter of aligning studs 18a and 18b with respect to the diameter of apertures 3a and 3b in order to allow for a slight inclination of the journal support plate with respect to the enclosure frame member 15.

It will, of course, be obvious that while two aligning studs 18a and 18b are shown, the present invention would work equally well where a larger number were employed, or where only one was employed since bolt member 2 in passing through aperture 16 of enclosure frame member 15, would serve the same purpose. In fact, the journal support plate of the present invention works equally well where no such studs are employed, as for example where the height adjusting screws 4c and 4d are adapted to fit into fixed shallow wells in enclosure frame member 15. In such a case the means whereby said plate is longitudinally and laterally aligned would simply be the wells in conjunction with the height adjusting screws.

Similarly, it will be seen that more than just a single pair of height adjusting screws can be employed. Thus, it would be possible to have a plate with four or more height adjusting screws members, and four or more aligning studs. In such a case, one of the four height adjusting screw members and one of the four aligning studs could be positioned at each corner of the base plate, and/or one height adjusting screw member could be positioned at each corner of the base plate, and one aligning stud could be positioned along each side of the base plate equidistant from the height adjusting screw members at each of the two corners formed by that side, and/or the respective positions of the aligning studs and height adjusting screw members could be interchanged.

It will also be noted that the bearing assembly 22 of FIG. 1 has a pair of threaded openings 21a and 21b at the bottom of the bearing assembly which facilitate attaching of the bearing assembly to the base plate. This arrangement is not essential to the practice of the present invention, and it should be noted that there are a number of commercially available bearing assembly devices in which the means for attaching the device to the frame members of the enclosure (and/or according to the present invention to the novel bearing support plate) comprises a pair of opposed flanges projecting outwardly from each side of the bearing assembly housing, said flanges being suitably drilled to permit a bolt to be passed through the aperture in the flange and through a suitable aperture in the frame member of the enclosure. While such a device can be used with the novel bearing support of the present invention, it will, of course, be understood that the upwardly projecting flanges 5a and 5b of FIG. 1 would have to be considerably extended upwardly in order to allow the threadably mounted positioning means 5c and 5d to clear the top of the bearing flanges projecting outwardly from the bearing housing, in order that the positioning means 5c and 5d can be caused to bear directly on the housing itself.

In conjunction with the journal support plate of the present invention I have found that leveling of the rollers can be further simplified by employing a high strength fine wire, such as for example, piano or music wire, which passes along the top of the rollers over a pair of pulley devices at each end of the enclosure. The wire has a weight at each end, whereby it will be kept taut even though it may contract or expand with the heating or cooling of the enclosure. By employing such a device, it is possible to align all of the rollers directly to a standard line created by the wire. Such aligning devices have, of course, long been known, however, the novel journal support plate of the present invention greatly facilitates adjustment of the rollers and/or the bearing assembly into alignment with such a standard, and further provides a means whereby said rollers may be aligned with such a standard within far finer tolerances than were heretofore possible.

It will, of course, be understood that while the preceding descriptions of the preferred embodiment of my invention stressed the use of my novel journal support plate in conjunction with a roller oven or kiln or the like, my invention has equal utility and similar advantages when used in conjunction with other roller apparatus. Thus, the novel journal support plate of the present invention could be employed in conjunction with roller mills, conveyors, and the like wherein it is desired to maintain the rollers in a predetermined horizontal, vertical, lateral, and/or axial alignment.

In view of the foregoing, it should now be obvious that many alterations, variations, changes and substitutions can be made with regard to the specific elements of the foregoing preferred embodiment and it will, therefore, be obvious that it is my intention to be limited only by the appended claims.

As my invention I claim:

1. In an apparatus of the type employing a series of rollers, mounted bearings, wherein said rollers must be maintained in a predetermined alignment within close tolerances, and wherein adjustment of the position of said roller is accomplished by altering the position of the bearing with respect to a frame member of said apparatus to which it is attached; the improvement which comprises a journal support plate, said journal support plate comprising:

(a) a base member having a centrally located recessed portion on its underside and a plurality of apertures and at least one slot, (b) an affixing means comprising a shaft for engagement with said recessed portion and for attachment to a frame member of the apparatus said shaft serving as a fulcrum over which the base plate can be tilted, (c) aligning means comprising a roll pin affixed to the frame member for insertion through an aperture in the base member, (d) adjusting means comprising a pair of diagonally opposed threaded bolts for insertion through diagonally opposed slots in the base member and for engagement in the frame member whereby the base member can be moved up or down in a vertical direction.

(e) attaching means for attaching the bearing to the base member comprising a pair of directly opposed threaded bolts for insertion through directly opposed apertures in the base member for engagement in corresponding threaded recessed portions of the bearing to allow longitudinal movement of said bearing with respect to the base member in a direction perpendicular to the axis of rotation of the roller, and (f) positioning means comprising a pair of directly opposed bolt devices suitably mounted in a pair of flanges said flanges projecting upwardly from said base member.

2. The journal support plate of claim 1 wherein the aligning means comprises a pair of diagonally opposed roll pins affixed to a frame member.

3. The journal support plate of claim 1 wherein the adjusting means comprises a pair of diagonally opposed threaded bolts which are inserted through diagonally opposed slots in the base member and through diagonally opposed apertures in the frame member and affixed to the frame member by means of a nut.

References Cited

UNITED STATES PATENTS

| | | | |
|---|---|---|---|
| 748,625 | 1/1904 | Lindsay | 308—58 |
| 915,552 | 3/1909 | Church | 308—58 |
| 1,090,577 | 3/1914 | Sheehan | 308—58 |
| 1,114,022 | 10/1914 | Olbrantz | 308—58 |
| 1,474,525 | 11/1923 | Graves. | |
| 2,195,841 | 4/1940 | Schlitters. | |
| 2,378,343 | 6/1945 | Walters. | |
| 2,389,034 | 11/1945 | Eisler | 308—58 X |

MARTIN P. SCHWADRON, Primary Examiner

L. L. JOHNSON, Assistant Examiner

U.S. Cl. X.R.

308—60

PO-1050
(5/69)

UNITED STATES PATENT OFFICE
CERTIFICATE OF CORRECTION

Patent No. 3,504,954        Dated    April 7, 1970

Inventor(s)    James T. Robson

It is certified that error appears in the above-identified patent and that said Letters Patent are hereby corrected as shown below:

In Claim 1, line 46, the word --in-- should be inserted between "mounted" and "bearings,".

SIGNED AND
SEALED
AUG 11 1970

(SEAL)
Attest:

Edward M. Fletcher, Jr.
Attesting Officer

WILLIAM E. SCHUYLER, JR.
Commissioner of Patents